United States Patent [19]

Wu et al.

[11] Patent Number: 6,108,919
[45] Date of Patent: Aug. 29, 2000

[54] AUTOMATIC OPTICAL PLUMBING INSTRUMENT

[76] Inventors: Chyi-Yiing Wu; Lin Chin Hsiung, both of P. O. Box 55-846, Taipei, Taiwan

[21] Appl. No.: 09/040,375

[22] Filed: Mar. 18, 1998

[30] Foreign Application Priority Data

Jul. 7, 1997 [TW] Taiwan .................................. 86211226

[51] Int. Cl.⁷ ........................................................ G01C 5/00
[52] U.S. Cl. .................... 33/292; 33/227; 33/291
[58] Field of Search ............................ 33/391, 227, 291, 33/292, 290; 356/138, 399

[56] References Cited

U.S. PATENT DOCUMENTS

| | | | |
|---|---|---|---|
| 2,601,643 | 6/1952 | Sulger | 33/391 |
| 2,839,834 | 6/1958 | Hardy | 33/391 |
| 4,082,466 | 4/1978 | Underberg | 33/291 |
| 4,656,752 | 4/1987 | Wu | 33/399 |
| 4,907,882 | 3/1990 | Waibel et al. | 33/292 |

FOREIGN PATENT DOCUMENTS 1485014  6/1989  U.S.S.R. .................. 33/292

*Primary Examiner*—Diego Gutierrez
*Assistant Examiner*—Faye Francis

[57] ABSTRACT

An automatic optical plumbing instrument includes: an objective telescopically mounted at a front portion of a telescopic housing adjacent to an object to be observed, an ocular telescopically mounted at a rear portion of the housing adjacent to an observer's eye, and a transparent plumbing protractor defining a plumbing line thereon and mounted in the housing between the objective and the ocular, whereby upon entrance of a vertical line (or plane) of the object into the instrument to form an image therein, a verticality of the vertical line (or plane) of the object can be checked whether the vertical line is aligned with the plumbing line marked on the protractor, thereby providing a plumbing instrument for calibrating a verticality of the object.

3 Claims, 8 Drawing Sheets

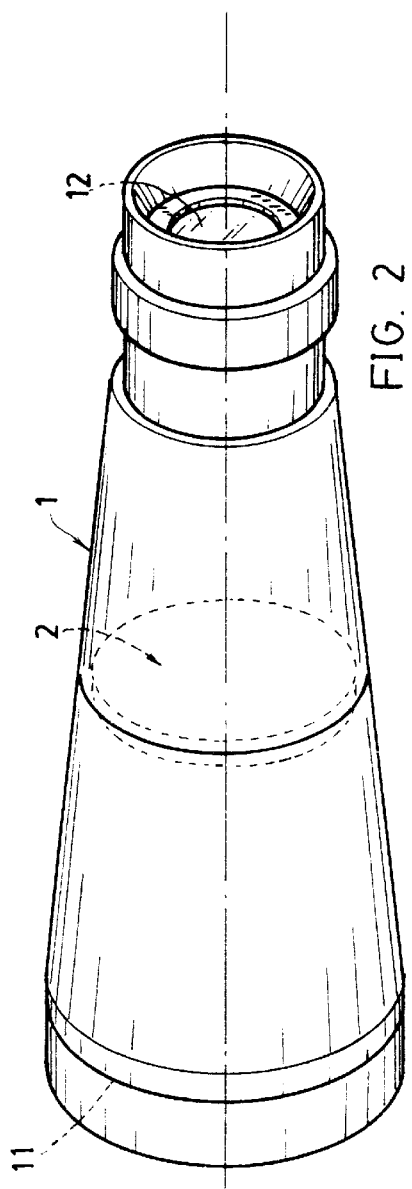
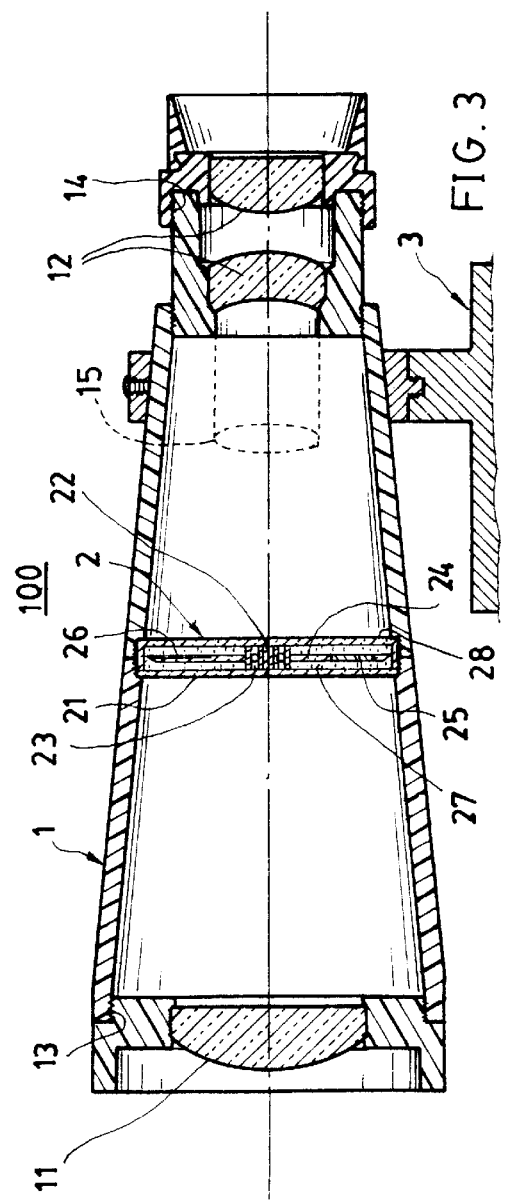

AUTOMATIC OPTICAL PLUMBING INSTRUMENT

BACKGROUND OF THE INVENTION

U.S. Pat. No. 4,656,752 to the same inventor of this application disclosed an angular level having a rotational protractor rotatably mounted in the casing, and a plumbing swing wheel pivotally secured in the protractor for measuring an angle when the level is laid on an object to be measured.

When it serves for calibrating a verticality of an object as viewed through the transparent plumbing swing wheel and the protractor, the protractor as filled with the transparent dampening oil (25a) may deflect the light and can not obtain a clear image through the lens-like protractor, thereby being impossible to provide as a plumbing instrument by directly viewing an image through the protractor.

The present inventor has found the drawbacks of the conventional angular level and invented the present optical plumbing instrument.

SUMMARY OF THE INVENTION

The object of the present invention is to provide an automatic optical plumbing instrument including: an objective telescopically mounted at a front portion of a telescopic housing adjacent to an object to be observed, an ocular telescopically mounted at a rear portion of the housing adjacent to an observer's eye, and a transparent plumbing protractor defining a plumbing line thereon and mounted in the housing between the objective and the ocular, whereby upon entrance of a vertical line (or plane) of the object into the instrument to form an image therein, a verticality of the vertical line (or plane) of the object can be checked whether the vertical line is aligned with the plumbing line marked on the protractor, thereby providing a plumbing instrument for calibrating a verticality of the object.

BRIEF DESCRIPTION OF THE DRAWINGS

FIG. 2 is a perspective view of the plumbing instrument of the present invention.

FIG. 3 is a sectional drawing of the present invention.

DETAILED DESCRIPTION

Figure 1:
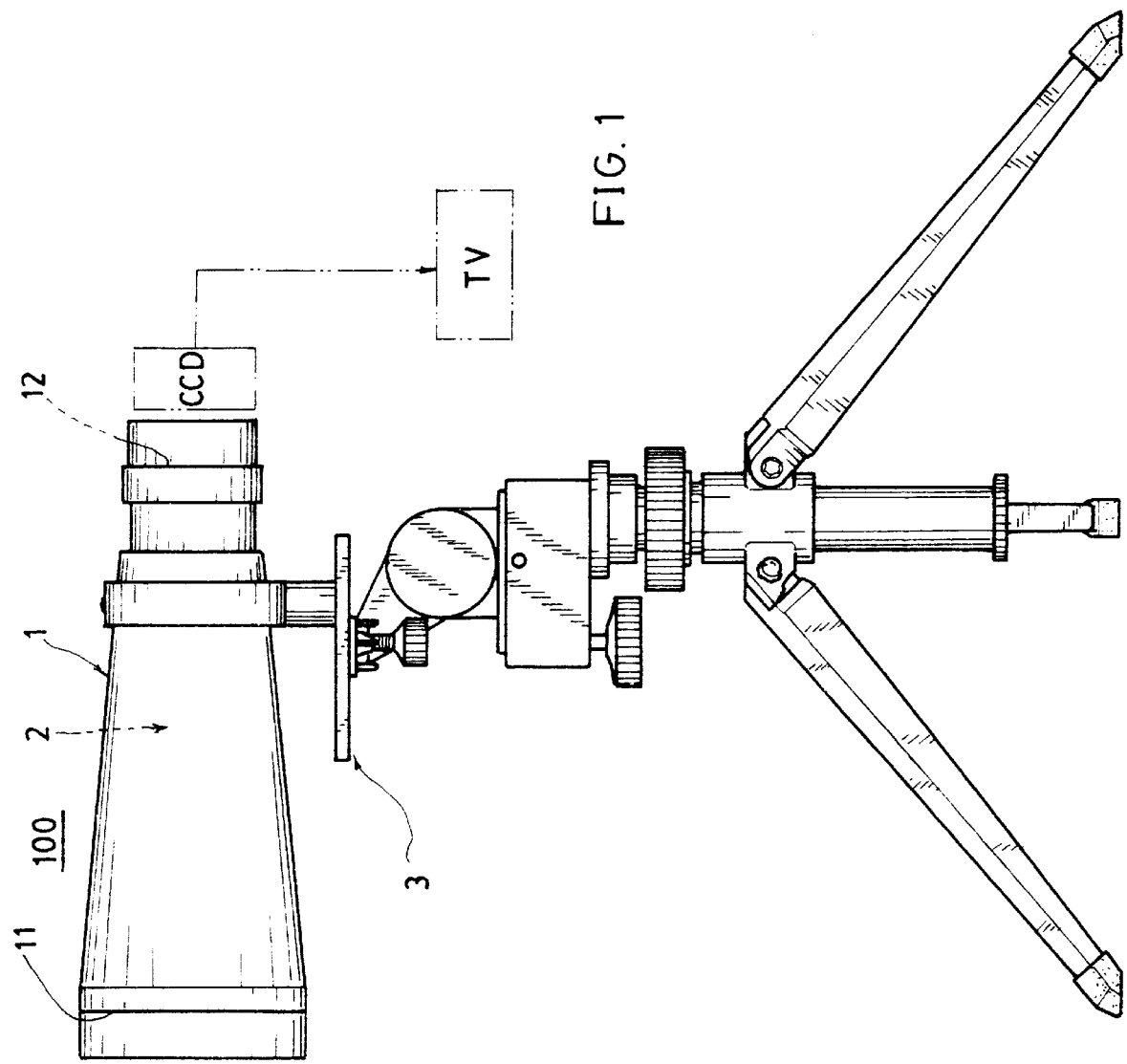
FIG. 1 is an illustration of the present invention when mounted on a stand.
Figure 4:
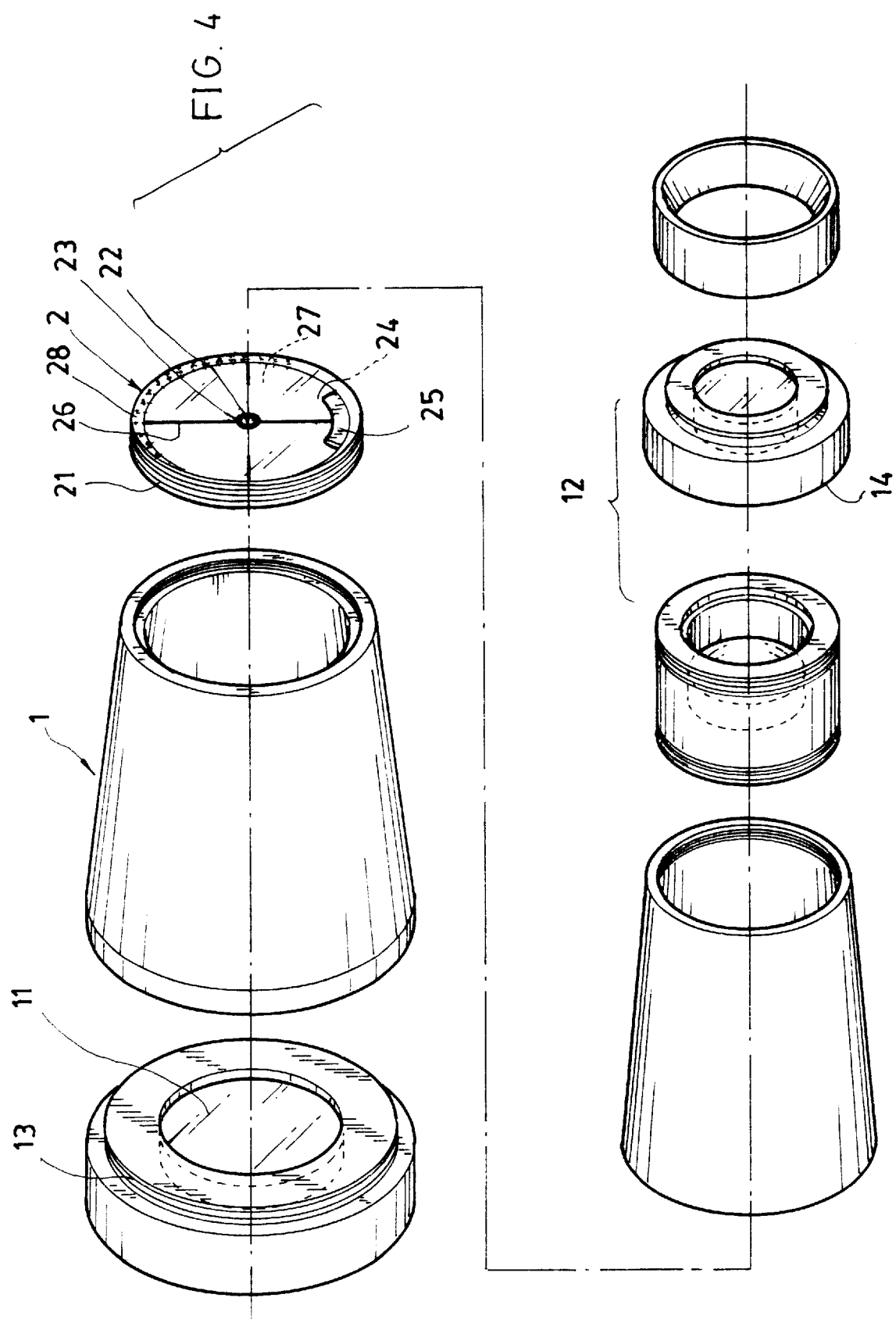
FIG. 4 is an exploded view showing the elements of the present invention.

As shown in FIGS. 1–6, a preferred embodiment of the automatic optical plumbing instrument 100 of the present invention comprises: a telescopic housing 1 which may be a cylindrical-shaped tube having an objective 11 telescopically mounted at a front portion of the housing 1 adjacent to an object to be observed, and an ocular 12 telescopically mounted at a rear portion of the housing 1 adjacent to an observer's eye; and a transparent plumbing protractor 2 pendulously rotatably secured in the housing 1 between the objective 11 and the ocular 12.

The instrument 100 may be mounted on a stand or tripod 3 as shown in FIG. 1. A CCD camera (CCD) may be further provided for picking up picture from the instrument 100 to be displayed on a monitor or television TV or be memorized in a computer system (not shown). The instrument 100 may be portable without being supported on the stand 3 for a convenient handling or uses by an engineer, technician or worker, not limited in the present invention.

The objective 11 is telescopically mounted at a front end portion of the telescopic housing 1 by an objective adjusting means 13 which may be a male and a female thread engageable with each other.

The ocular 12 is telescopically mounted at a rear end portion of the telescopic housing 1 by an ocular adjusting means 14 which may also be a male and a female thread engageable with each other.

An object to be observed enters the housing 1 through the objective 11 to form an image (not shown) at a focus of the objective 11, which also coincides with a focus of the ocular 12. The magnification as defined by a ratio of a focal length of the objective to that of the ocular may be varied and not limited in the present invention. The magnification ratio may also be 1:1 for a short distance (such as 3 meters) between the object to be observed and the present invention for calibrating an object having a height of 1.8 m, but the data of this invention are not limited.

An image-inverting means 15 such as an inverting lens or a prism may be inserted between the objective 11 and the ocular 12 for erecting the image upright when viewing the image of the object through the ocular 12.

The transparent plumbing protractor 2 includes: a transparent circular casing 21 mounted in the housing 1 between the objective 11 and the ocular 12, and located at a focus of the ocular 12; a transparent plumbing wheel 24 rotatably mounted in the circular casing 21 about a pivot 22 fixed at a center of the casing 21 by a bearing 23; a plumb weight 25 secured at a lower portion of the plumbing wheel 24 for pendulously rotating the wheel 24 within the casing 21; a plumb-line mark 26 diametrically formed on the plumbing wheel 24 to align with a gravity center of the plumbing wheel 24 loaded with the plumb weight 25 thereon; a transparent liquid or oil 27 filled in the casing 21 for damping the plumbing wheel 24 as pendulously rotated within the casing 21 about the pivot 22; and a plurality of angular graduations 28 annularly formed on a periphery of the casing 21 for indicating an angle of a vertical line (or plane) of an object to be observed as deviated from the plumb-line mark 26 or indicating an alignment with the plumb-line mark 26 on the wheel 24.

Figure 5:
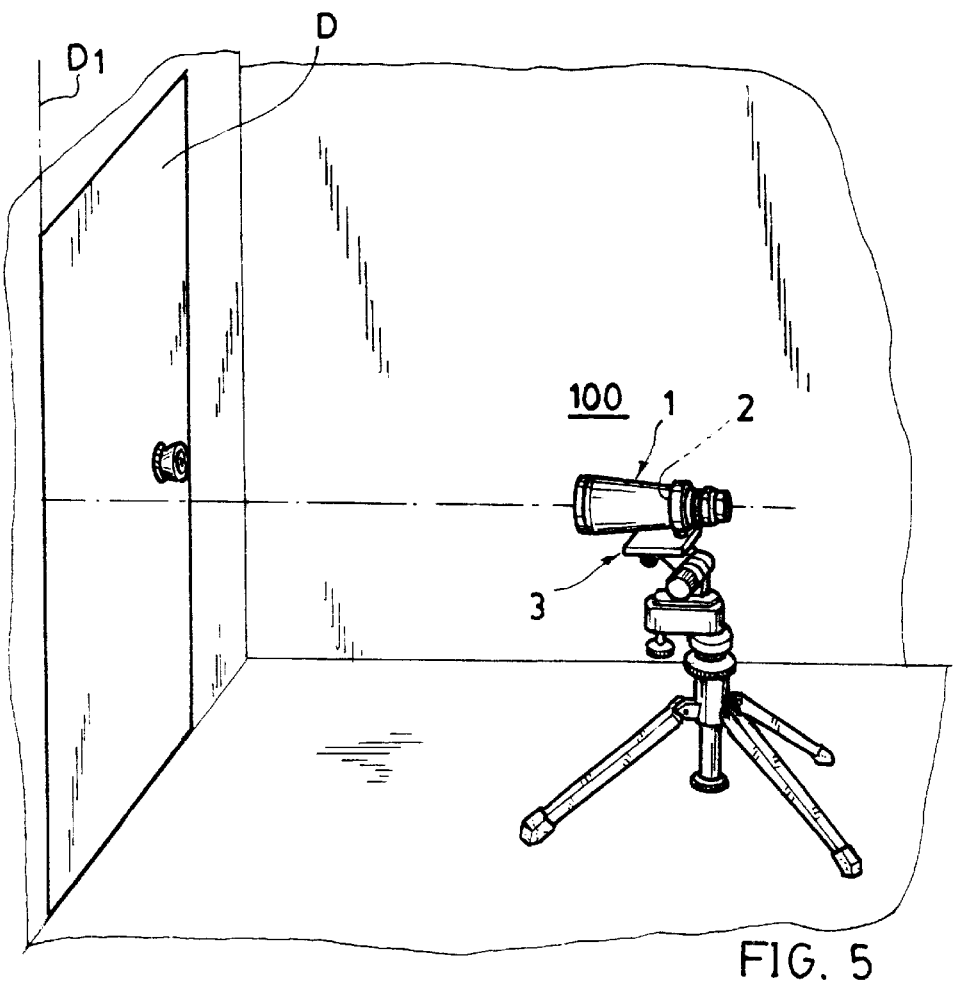
FIG. 5 is an illustration showing a calibration made in accordance with the present invention.
Figure 6:
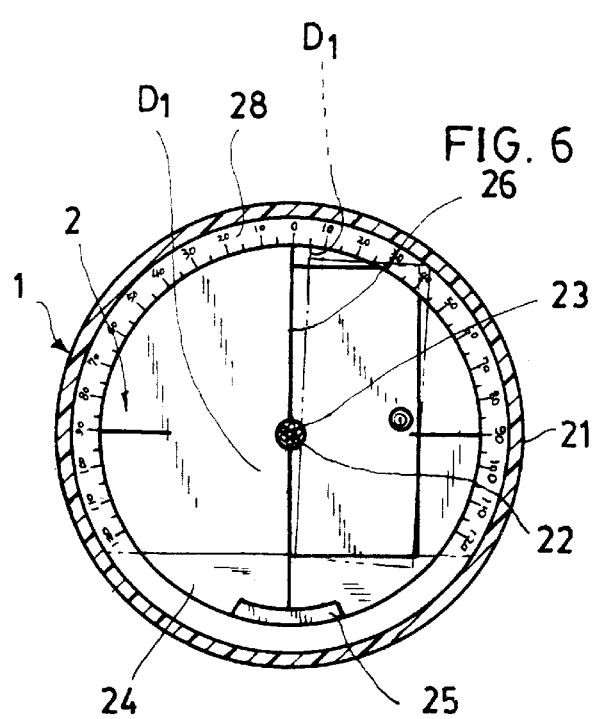
FIG. 6 is an illustration for performing the job as shown in FIG. 5 when observing through the instrument of the present invention.
Figure 7:
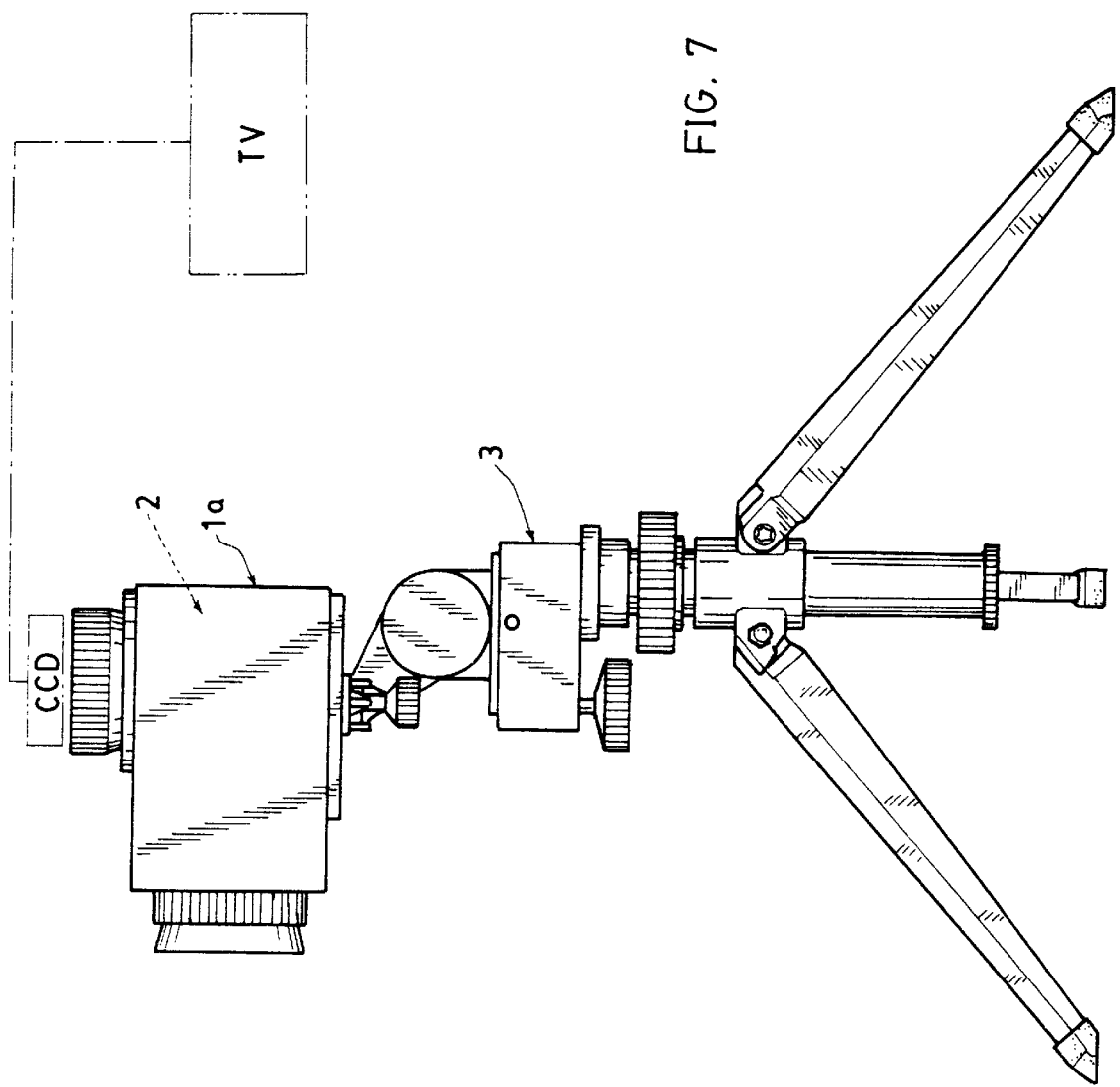
FIG. 7 shows another preferred embodiment of the present invention when mounted on a stand.

As shown in FIGS. 5, 6, a vertical line (or plane) D1 of a door D as viewed through the instrument of the present invention may be calibrated whether it is aligned with or deviated from the plumb-line mark 26 of the plumbing protractor 2 for checking the verticality of the vertical line D1 of the door D.

By using the present invention, it can be directly used for checking or calibrating a verticality of an object even under sunlight exposure. This invention does not require any electric energy (such as battery) and is not influenced by sunlight to be especially superior to a conventional laser instrument by which a laser light emitted from the laser instrument may be unclear as exposed under the sunlight.

The present invention may be modified without departing from the spirit and scope of the present invention.

Figure 9:
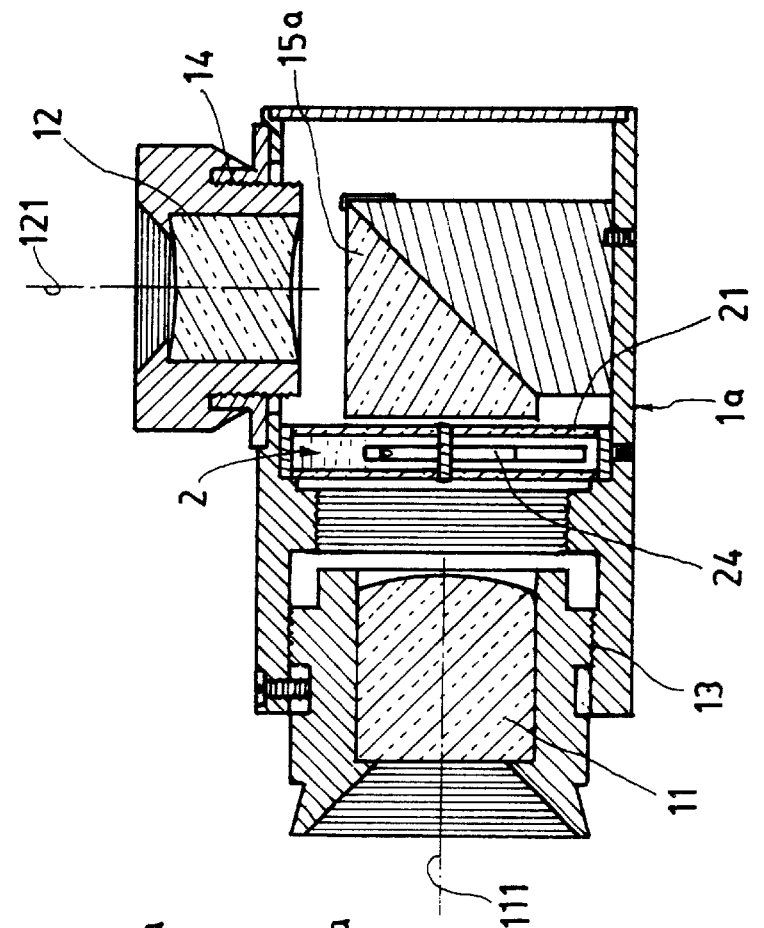
FIG. 9 is a sectional drawing of FIG. 8.
Figure 8:
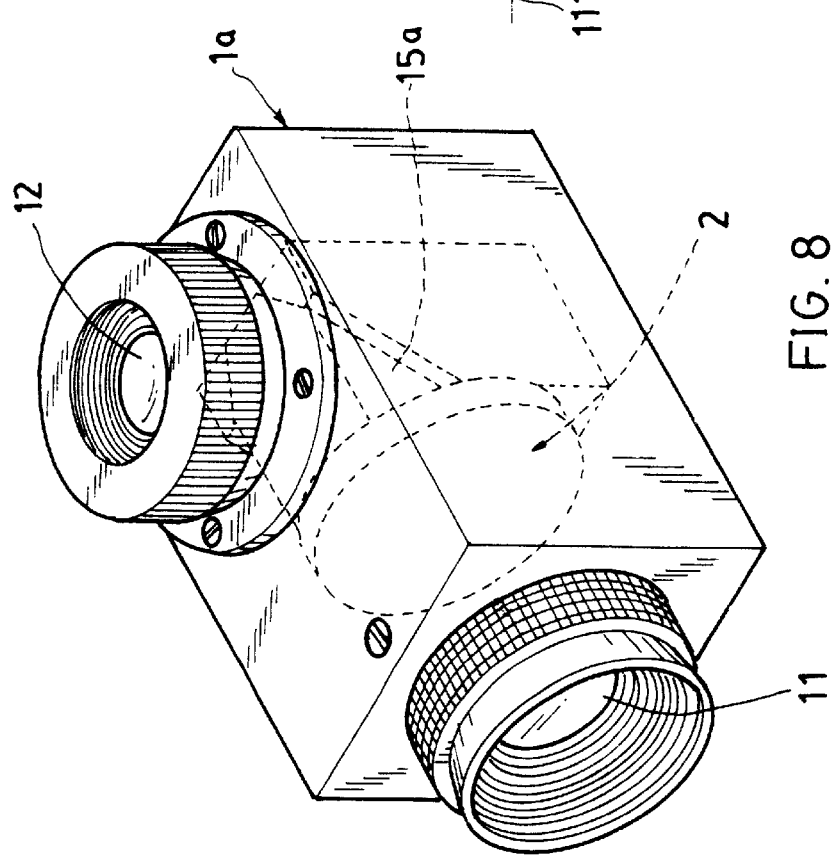
FIG. 8 is a perspective view of the optical plumbing instrument as shown in FIG. 7.
Figure 10:
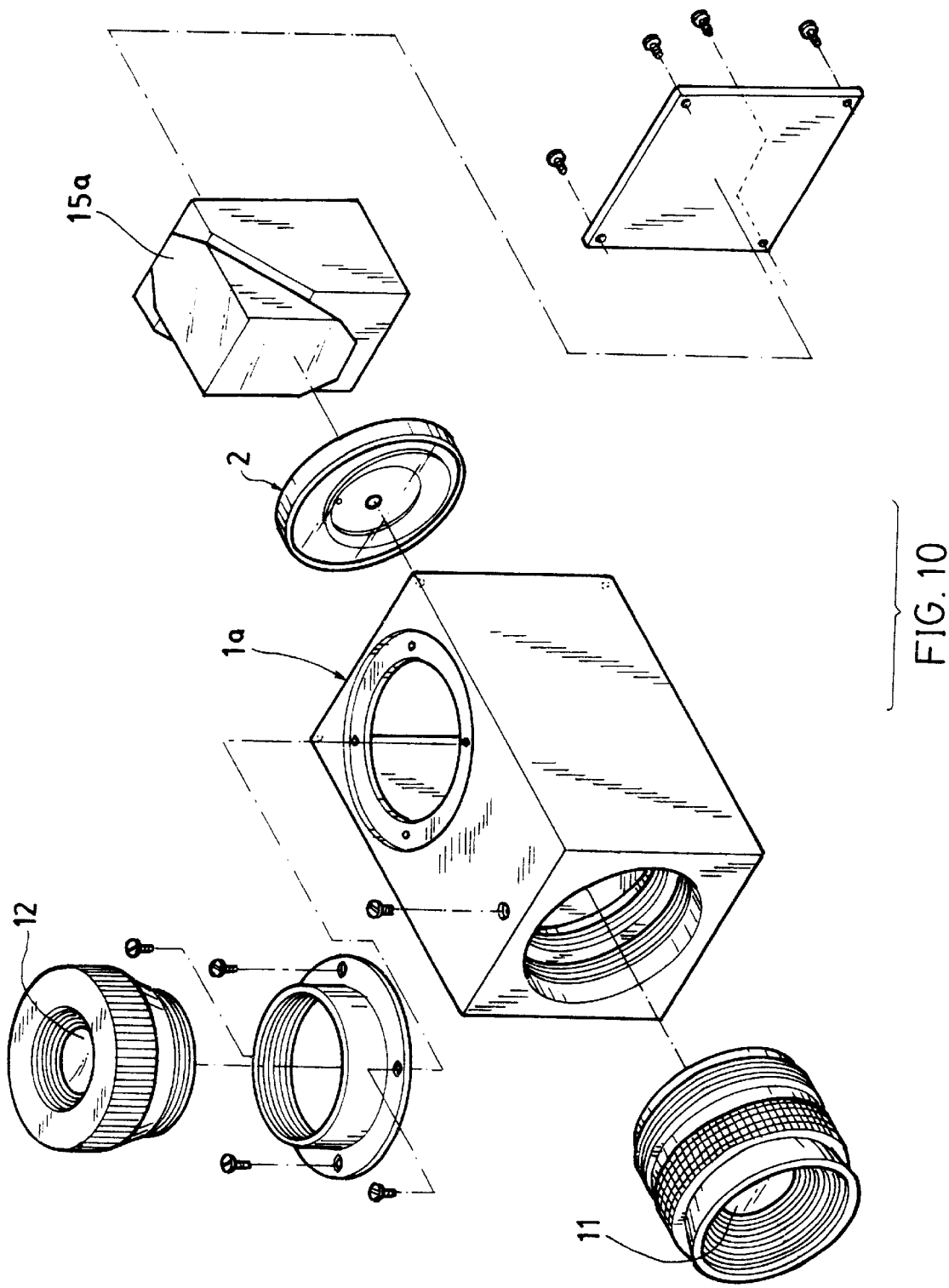
FIG. 10 is an exploded view of the instrument as shown in FIG. 8.
Figure 11:
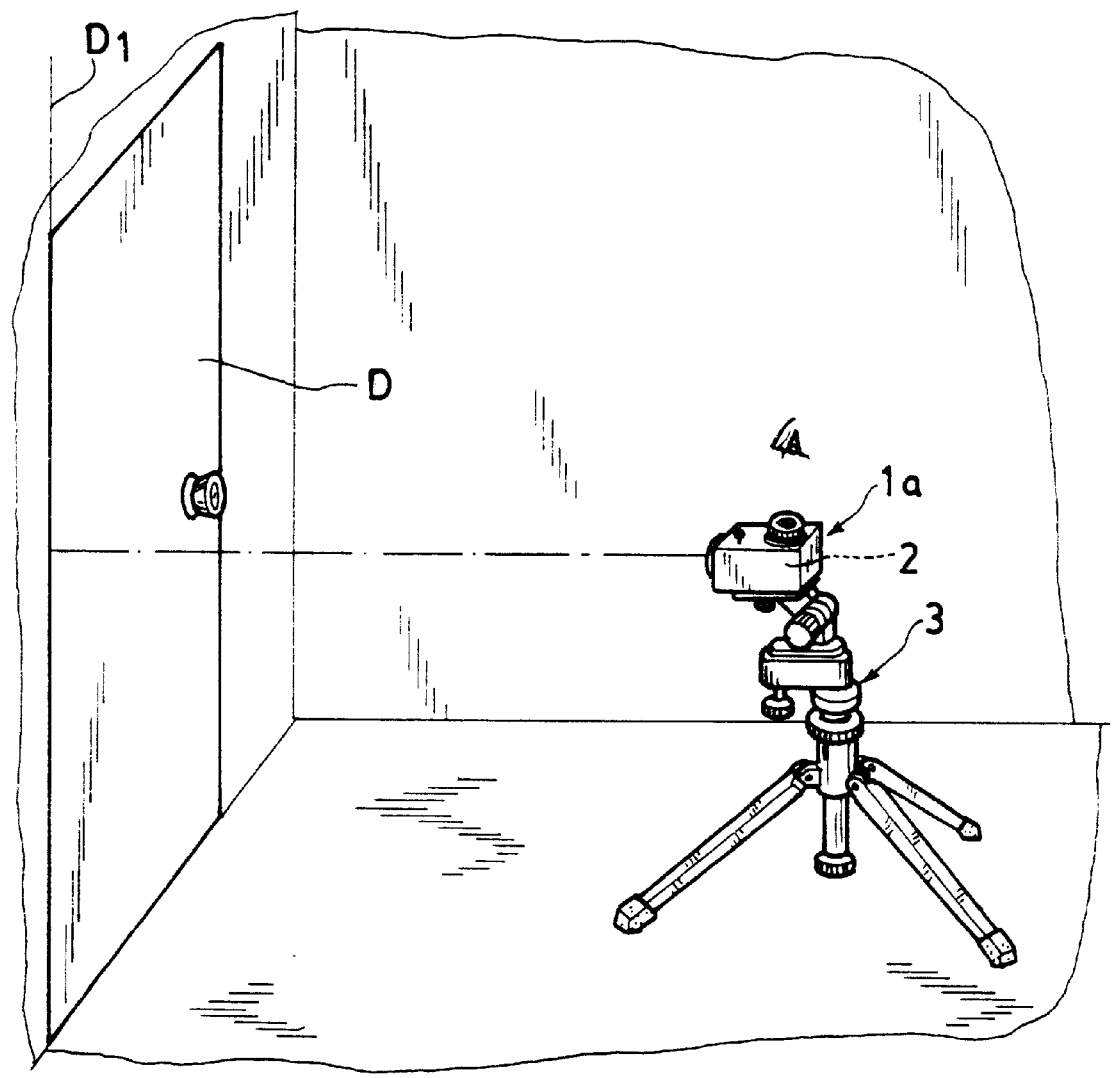
FIG. 11 is an illustration showing a calibration made by the instrument as shown in FIG. 8.

Another preferred embodiment of the present invention is shown in FIGS. 7–11, including a prism 15a mounted in a telescopic housing 1a between the transparent plumbing protractor 2 and the ocular 12 for shortening the length of the housing 1a to be shorter than that of the telescopic housing 1 as aforementioned for convenient portable use. The prism 15a also serves as an image-inverting means for upright erecting the image of the object to be observed through the ocular 12. The axis 121 of the ocular 12 is projectively perpendicular to the axis 111 of the objective 11 in accordance with the modified instrument as shown in FIG. 9. Therefore, the image entered from the objective 11 will be deflected at a right angle towards the ocular to be observed through the ocular 12.

What is claimed is:

1. An automatic optical plumbing instrument for checking verticality of an object comprising:

a telescopic housing;

an objective telescopically mounted at a front portion of the telescopic housing adjacent to an object to be observed;

an ocular telescopically mounted at a rear portion of the telescopic housing adjacent to an observer's eye for observig the image of the object through said ocular; and a transparent plumbing protractor having a plumbing line defined on said protractor and mounted in said telescopic housing in between said objective and said ocular for checking a verticality a vertical line of the object to be observed when said vertical line enters the telescopic housing to form an image of said vertical line as aligned with the plumbing line on said protractor; said transparent plumbing protractor including: a transparent circular casing mounted in the housing between the objective and the ocular, and located at a focus of the ocular; a transparent plumbing wheel rotatably mounted in the circular casing about a pivot fixed at the longitudinal centerline of the casing; a plumb weight secured at a lower portion of the plumbing wheel for pendulously rotating the wheel within the casing; a plumb-line mark diametrically formed on the plumbing wheel to align with a gravity center of the plumbing wheel loaded with the plumb weight thereon; a transparent liquid filled in the casing for damping the plumbing wheel as pendulously rotated within the casing about the pivot; and a plurality of angular graduations annularly formed on a periphery of the casing for indicating an angle of said vertical line of said object to be observed as deviated from said plumb-line mark or indicating an alignment of said vertical line with the plumb-line mark on the wheel.

2. An automatic optical plumbing instrument according to claim 1, wherein said telescopic housing has an image-inverting means selected from a lens and a prism and inserted in between said objective and said ocular for upright erecting the image of the obect to be observed.

3. An automatic optical plumbing instrument for checking verticality of an object comprising:

a telescopic housing;

an objective telescopically mounted at a front portion of the telescopic housing adjacent to an object to be observed;

an ocular projectively perpendicular to said objective and telescopically mounted at a rear portion of the telescopic housing adjacent to an observer's eye;

a transparent plumbing protractor having a plumbing line defined on said protractor and mounted in said telescopic housing in between said objective and said ocular; and a prism secured in said housing between said protractor and said ocular for deflecting the image of the object at a right angle towards the ocular to be observed through said ocular;

said protractor having said plumbing line defined on said protractor for checking a verticality of a vertical line of the object to be observed when said vertical line enters the telescopic housing to form an image of said vertical line as aligned with the plumbing line on said protractor; and an angle of said vertical line is obtainable as deviated from said plumbing line on said protractor when the vertical line is not aligned with the plumbing line; said transparent plumbing protractor including: a transparent circular casing mounted in the housing between the objective and the ocular, and located at a focus of the ocular; a transparent plumbing wheel rotatably mounted in the circular casing about a pivot fixed at the longitudinal centerline of the casing; a plumb weight secured at a lower portion of the plumbing wheel for pendulously rotating the wheel within the casing; a plumb-line mark diametrically formed on the plumbing wheel to align with a gravity center of the plumbing wheel loaded with the plumb weight thereon; a transparent liquid filled in the casing for damping the plumbing wheel as pendulously rotated within the casing about the pivot;

and a plurality of angular graduations annularly formed on a periphery of the casing for indicating an angle of said vertical line of said object to be observed as deviated from said plumb-line mark or indicating an alignment of said vertical line with the plumb-line mark on the wheel.

\* \* \* \* \*